US011038589B2

(12) United States Patent
McElveen et al.

(10) Patent No.: US 11,038,589 B2
(45) Date of Patent: *Jun. 15, 2021

(54) VISUAL LIGHT AUDIO TRANSMISSION SYSTEM AND PROCESSING METHOD

(71) Applicant: Wave Sciences, LLC, Charleston, SC (US)

(72) Inventors: James Keith McElveen, Charleston, SC (US); Gregory S. Nordlund, Jr., Charleston, SC (US); Leonid Krasny, Cary, NC (US)

(73) Assignee: Wave Sciences, LLC, Charleston, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/867,397

(22) Filed: May 5, 2020

(65) Prior Publication Data

US 2020/0266890 A1 Aug. 20, 2020

Related U.S. Application Data

(63) Continuation-in-part of application No. 16/460,902, filed on Jul. 2, 2019, now Pat. No. 10,644,796, which is a continuation-in-part of application No. 15/958,938, filed on Apr. 20, 2018, now Pat. No. 10,341,017.

(51) Int. Cl.
*H04B 10/116* (2013.01)
*G10L 21/0232* (2013.01)
*H04R 3/00* (2006.01)
*H04R 1/04* (2006.01)
*H04B 10/54* (2013.01)

(52) U.S. Cl.
CPC ........ *H04B 10/116* (2013.01); *G10L 21/0232* (2013.01); *H04B 10/541* (2013.01); *H04R 1/04* (2013.01); *H04R 3/005* (2013.01)

(58) Field of Classification Search
CPC ...... H04B 10/116; H04B 10/541; H04R 1/04; H04R 3/005; G01L 21/0232
USPC ...................................................... 398/118
See application file for complete search history.

(56) References Cited

U.S. PATENT DOCUMENTS

| | | | |
|---|---|---|---|
| 10,644,796 B2 * | 5/2020 | McElveen | H04R 1/1091 |
| 2011/0194704 A1 * | 8/2011 | Hetherington | H04R 5/04 381/26 |
| 2012/0070153 A1 * | 3/2012 | Jonsson | F21V 33/0076 398/115 |

(Continued)

*Primary Examiner* — Dalzid E Singh
(74) *Attorney, Agent, or Firm* — Gregory Finch; Finch Paolino, LLC

(57) ABSTRACT

A visible light audio system is operable to enable free space optical communication of audio signals via transmission of modulated light intensity at a light source to a photo diode being operably engaged with a demodulator and audio output device. Embodiments of the present disclosure enable a plurality of visible light transmitting apparatuses being installed in a commercial or residential dwelling and operably engaged over a network to combine their microphone inputs via spatial, amplitude, spectral, and/or temporal filtering and physical and geometrical modeling methods to separate one or more acoustic sources using a visible light audio system comprising an array of light sources being operable to receive an audio source input.

20 Claims, 12 Drawing Sheets

(56) References Cited

U.S. PATENT DOCUMENTS

| | | | |
|---|---|---|---|
| 2013/0343762 A1* | 12/2013 | Murayama | H04B 10/116 |
| | | | 398/130 |
| 2014/0354161 A1* | 12/2014 | Aggarwal | H05B 47/105 |
| | | | 315/153 |
| 2018/0115825 A1* | 4/2018 | Milne | H04B 10/116 |
| 2018/0205459 A1* | 7/2018 | Verma | G09F 13/00 |
| 2019/0103915 A1* | 4/2019 | Stout | H04N 5/2353 |
| 2019/0319705 A1* | 10/2019 | Harris | H04W 40/30 |

* cited by examiner

VISUAL LIGHT AUDIO TRANSMISSION SYSTEM AND PROCESSING METHOD

CROSS-REFERENCE TO RELATED APPLICATIONS

This application is a continuation-in-part of U.S. patent application Ser. No. 16/460,902 filed on Jul. 2, 2019 and entitled, "VISUAL LIGHT AUDIO TRANSMISSION SYSTEM AND PROCESSING METHOD," said application being a continuation-in-part of U.S. patent application Ser. No. 15/958,938 filed on Apr. 20, 2018 and entitled, "VISUAL LIGHT AUDIO TRANSMISSION SYSTEM"; each of said applications being hereby incorporated herein at least by reference in their entireties.

FIELD

The present invention is in the technical field of data communication systems. More particularly, the present invention is in the technical field of free space optical data communication systems and methods for retrieving, capturing, or separating an acoustic source, particularly speech, and communicating it by optical means. The present invention relates to a communication system that utilizes free space optical signaling and whose transmitting component is installed in a conventional lighting system.

BACKGROUND

It is well known that a light beam can be varied in intensity to produce a signal containing information within the amplitude modulation. Furthermore, telecommunications systems rely upon modulating the wavelengths of the light signals in fiber optics, to impart data onto the light beam. Furthermore, it has been shown that a fluorescent light source can be used as a one-way communications device (Dachs, U.S. Pat. No. 3,900,404, Aug. 19, 1975) for voice communications using an external modulated signal imparted upon the lamp's AC current in an amplitude modulation scheme.

The inherent weakness in this system (Dachs) is the fact that the observed light flickers as a function of the audio signal's intensity. For many applications, this is an unacceptable solution. Subsequent publications and inventions have conceived different modulation techniques such as pulse code modulation and timing modulation and have adapted the encoding techniques for applications that require greater data bandwidths with mixed data types (Leeb, et al., U.S. Pat. No. 6,794,831, Sep. 21, 2004); however, these designs are complex and require a greater amount of power, circuitry, and cost to accomplish.

Hearing impaired people lose their ability to distinguish speech signal in ambient noise since the human hearing system is sensitive to interfering noise. Interfering noise decreases the quality and intelligibility of the speech signal. Speech enhancement techniques use signal processing to reduce the noise and improve the perceptual quality and intelligibility of the speech signal. However, these techniques are generally ineffective when the noise also consists of speech as it is difficult to distinguish between the desired speech signal and the undesired speech, which is considered to be noise.

Beamforming is a common technique of spatial filtering used for enhancing speech coming from a prescribed direction while eliminating noise (including speech) coming from other directions, relative to how they arrive at the microphone array embedded in the hearing aid(s). Beamforming technology does this by creating a constructive interference pattern (i.e., focus) in a particular direction and destructive interference pattern (i.e., null) in other directions. A beamforming microphone array can thereby be used to take advantage of some combination of spatial, temporal and spectral information to create a beam to "listen" in a desired direction. Beamforming approaches can be fixed, with a beam electronically steered in a predetermined fixed direction (usually normal to the line or plane of the microphone array's microphone elements), or electronically-steerable by allowing the electronic steering of the beam in a desired direction, upon demand. (Of course, mechanically re-orienting a fixed array will also effectively change its steering.) Beamforming is performed in devices such as hearing aids to enhance the signal-to-noise ratio (SNR) of the desired speech source and, in doing so, to increase the speech intelligibility by the user of the hearing aids based on the characteristic ability of the human auditory system to recognize signals (sounds) that are higher than the background (ambient) noise.

Prior art directional beamforming solutions are dependent upon the listener physically looking at a target to obtain maximum amplification; for example, fixed beamform hearing aids. A speech source, whether associated with a human talker or mechanical transducer, does not represent an ideal, spherical radiator. In the case of a room-size, near-field environment, any realistic source possesses a clear degree of directionality and spatial attenuation. This implies that a sensor that is facing the talker will tend to receive a stronger signal than sensors located to the side or physically behind the source. There are many instances where a participant in a conversation may not be actively looking at other participants. Accordingly, prior art solutions exhibit a number of flaws that hamper the hearing impaired to use these self-contained microphone array devices. These include poor performance amid background noise and low sensitivity at low frequencies. This is an intricate problem due the existence of several sources of error, such as periodicity in correlated signals and coherent noise or multi-path due to reverberation, and misidentification of desired source signals. Some prior art solutions, in an attempt to compensate for this issue, use an adaptive approach where they operate somewhat independently of the mechanical pointing and instead try to identify noise source and location and steer nulls toward them. Such prior art solutions, however, are not effective for wearable devices.

The pressure and velocity of a homogeneous acoustic field are governed by the Helmholtz equations. Any spatial wave field can also be described using the solutions to these equations. One approach to solving the acoustic wave equation is based on the pressure and its normal derivatives at a boundary. Green's second identity is applied to the homogeneous acoustic wave Helmholtz's equation to obtain the Helmholtz Integral Equation. The Green's Function represents an impulse response to an inhomogeneous differential equation. For a spatially constrained source located at a particular location (i.e., a point source in space), the Green's Function represents the transfer function of the acoustic channel between the source and any other location in space, as well as provides for boundary conditions (e.g. the location and other properties of walls, floor, and ceiling of an interior room), thereby modeling both the physical and geometrical properties of the acoustic environment. Optimally estimating the one or more Green's Functions of an acoustic environment and the sound capture system that receives the audio input allows the reconstruction of the one or more original sounds that emanate from point sources in various locations in the environment. Green's Function processing thereby allows separation of acoustic sources in real environments with fewer microphones than other spatial processing methods, such as beamforming.

Through applied effort, ingenuity, and innovation, Applicant has identified a number of deficiencies and problems with distinguishing speech signals in an ambient noise environment where the need exists for better methods to separate a speech or sound source and communicate that information. Applicant has developed a solution that is embodied by the present invention, which is described in detail below.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Several objects and advantages of the present invention are:

(a) to allow construction of an optical communication system whose transmitter simultaneously functions as a lighting device;

(b) to allow construction of said optical communication system and light device which operates without flicker or other effects upon the light that could be annoying or even noticeable to a casual observer;

(c) to allow construction of a communication system without the use of radio signals which may interfere with other electronic equipment or systems;

(d) to allow construction of conveniently powered and even power efficient, localized one- or two-way communications in indoor, or even outdoor, environments;

(e) to allow construction of said optical communication system which has minimal cost of manufacture for both the transmitter and receiver;

(f) to allow construction of said optical communication system whose transmitter can be adapted to a wide variety of residential or commercial building fixtures;

(g) to allow construction of a communications system that is contained by means of simple barriers that are opaque at the optical frequencies of interest; and, (h) to allow construction of an optical communications system whose networked arrangement of light transmitting apparatuses includes microphones that can be used individually or in combination to capture and separate sound sources from one or more desired spatial locations, such as a pulpit, lectern, or conference room, auditorium, or classroom seat.

Certain aspects of the present disclosure provide for a visible light audio system comprising one or more light transmitting apparatuses being located within an acoustic environment and operably engaged to comprise an array, the plurality of light transmitting apparatuses comprising a plurality of transducers being configured to capture or transmit acoustic audio signals; a computing device comprising an audio processing module communicably engaged with the one or more light transmitting apparatuses to receive an audio input comprising the acoustic audio signals, the audio processing module comprising at least one processor and a non-transitory computer readable medium having instructions stored thereon that, when executed, cause the processor to perform one or more spatial audio processing operations, the one or more spatial audio processing operations comprising: receiving the audio input comprising the acoustic audio signals; processing the audio input to determine at least one acoustic propagation model for at least one source location within the acoustic environment, the at least one acoustic propagation model comprising at least one Green's Function estimation; processing the audio input according to the at least one acoustic propagation model to spatially filter at least one target audio signal from one or more non-target audio signals within the audio input to derive a processed audio output, wherein the target audio signal corresponds to the at least one source location; and transmitting the processed audio output via the one or more light transmitting apparatuses.

In certain embodiments, the visible light audio system may be configured wherein the one or more light transmitting apparatuses are communicably engaged via a networked configuration. In some embodiments, the networked configuration may comprise a wireless or wireline communications interface. In some embodiments, the processed audio output may comprise a modulated visible light output. In certain embodiments of the visible light audio system, the processing module may be configured wherein the one or more spatial audio processing operations further comprise calculating at least one noise reduction filter. The processing module may be configured wherein the one or more spatial audio processing operations further comprise applying a phase correction filter to the processed audio output. The processing module may be configured wherein the one or more spatial audio processing operations further comprise applying a whitening filter to the at least one target audio signal. In some embodiments, the whitening filter may be applied concurrently or concomitantly with the at least one acoustic propagation model. In accordance with certain aspects of the present disclosure, the audio input may comprise a live audio feed and/or a recorded audio file.

Further aspects of the present disclosure provide for a spatial audio processing method comprising receiving, with one or more light transmitting apparatuses comprising one or more acoustic transducers, an audio input; processing, with an audio processor, the audio input to determine at least one acoustic propagation model for at least one source location within an acoustic environment, the at least one acoustic propagation model comprising at least one Green's Function estimation; processing, with the audio processor, the audio input according to the at least one acoustic propagation model to spatially filter at least one target audio signal from one or more non-target audio signals within the audio input to derive a processed audio output, wherein the target audio signal corresponds to the at least one source location; and transmitting, via the one or more light transmitting apparatuses, the processed audio output. In some embodiments, the processed audio output may comprise a modulated visible light output.

In accordance with further aspects of the present disclosure, the spatial audio processing method may further comprise receiving, with a receiver device, the modulated visible light output. In some embodiments, the method may further comprise outputting, with at least one audio output device operably engaged with the receiver device, the processed audio output. The method may further comprise calculating, with the audio processor, at least one noise reduction filter. In some embodiments, the method may further comprise applying, with the audio processor, a phase correction filter to the processed audio output. The method may further comprise applying, with the audio processor, a whitening filter to the at least one target audio signal to derive the processed audio output. In accordance with certain aspects of the present disclosure, the audio input may comprise a live audio feed and/or a recorded audio file.

Still further aspects of the present disclosure provide for a non-transitory computer-readable medium encoded with instructions for commanding one or more processors to execute operations of a method for spatial audio processing, the operations comprising receiving an audio input comprising at least one target audio signal and non-target audio signals; processing the audio input to determine at least one acoustic propagation model for at least one source location within an acoustic environment, the at least one acoustic propagation model comprising at least one Green's Function estimation; processing the audio input according to the at least one acoustic propagation model to spatially filter the at least one target audio signal from the non-target audio signals to derive a processed audio output, wherein the target audio signal corresponds to the at least one source location; and transmitting the processed audio output via one or more light transmitting devices.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF THE DRAWINGS

The figures form a part of the invention disclosure and are used to illustrate embodiments but not to limit the scope of the claims to that embodiment. In the following, the invention will be described in more detail with reference to the drawing, where:

DETAILED DESCRIPTION

Figure 1:
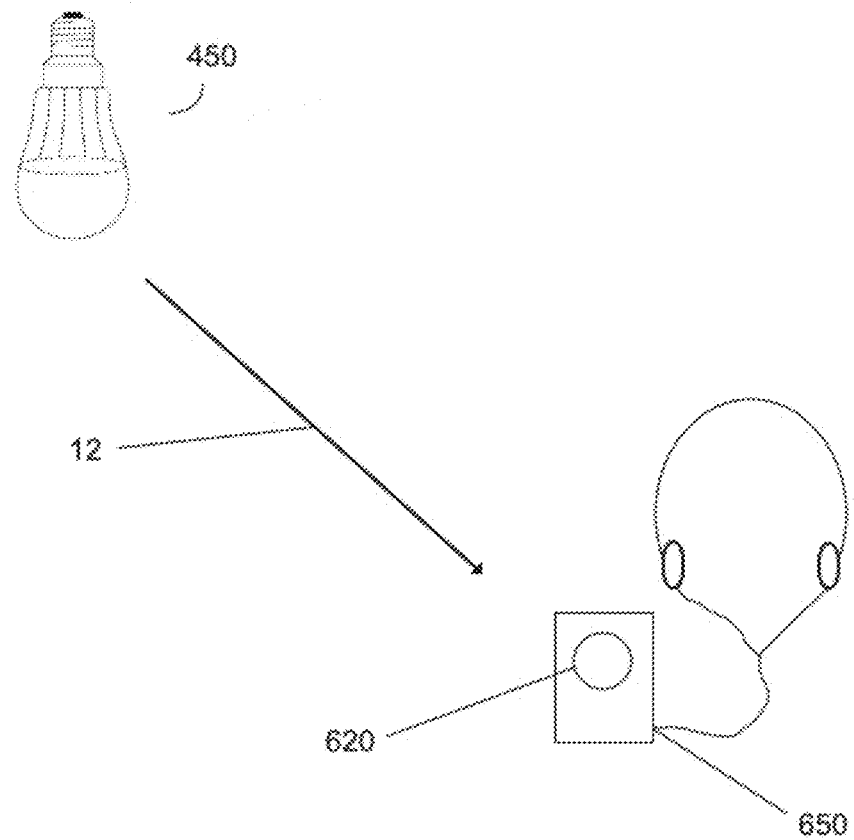
FIG. 1 is a system diagram of an embodiment of the present disclosure.

Exemplary embodiments are described herein to provide a detailed description of the present disclosure. Variations of these embodiments will be apparent to those of skill in the art. Moreover, certain terminology is used in the following description for convenience only and is not limiting. For example, the words "right," "left," "top," "bottom," "upper," "lower," "inner" and "outer" designate directions in the drawings to which reference is made. The word "a" is defined to mean "at least one." The terminology includes the words above specifically mentioned, derivatives thereof, and words of similar import.

Without loss of generality, some descriptions further herein below will refer to an exemplary scenario in which the innovation is used in airports, the meat packing industry, oil/gas industry, medical radiology centers, chemical plants involved with explosive materials, libraries and museums, and law enforcement.

The need exists for methods to distinguish speech signals in an ambient noise environment, particularly where the interfering noise sources are speech or speech-like. Embodiments of the present disclosure enable spatial processing methods to separate one or more acoustic sources using a visible light audio system comprising one or more transmitting apparatuses being operable to receive audio source input. The visible light audio system is operable to enable free space optical communication of audio signals via transmission of modulated light intensity at a light source to a photo diode being operably engaged with a demodulator and audio output device. In accordance with certain embodiments, the methods to locate and discriminate one or more acoustic source comprise at least one beamformer to process acoustic signals or using estimations from a Green's Function model to estimate the one or more acoustic sources, from data received by a spatially distributed array of transmitting apparatuses being operable to receive audio source input. In other embodiments, methods to identify and separate one or more acoustic sources use a processing algorithm, comprising Green's Function sound propagation model filtering, to isolate sounds from a point source at a certain location.

With some degree of particularity, embodiments of the present disclosure enable an audio capture method for a distributed microphone array, capable of being implemented in a visible light audio system, comprising: 1) analyzing sounds arriving at an array of microphones or other transducers using statistical, probabilistic, Markov Model, or neural network methods to determine physical or geometrical characteristics that uniquely identify sounds that emanate or pass through a particular spatial location defined in three-dimensions in the acoustical environment that can be described mathematically as a point source; 2) creating, using the characterization calculated or learned in Step 1), a filter that suppresses any and all other point sources in the sounds received by the plurality of microphones (this suppression does not necessarily result in a high quality audio output but instead may result in a low quality output that smears any incoming sounds that do not appear to be point sources that could have come from the calculated or learned location, with the goal of causing all other sounds other than the sounds from the desired/learned location to be smeared enough to be different from normal speech-like signals to enable further noise-reduction filtering methods to be effective); and, 3) further suppressing any sounds that are not from the learned/desired location based on the differences between the residual desired/learned signal and the smeared undesired sounds from Step 2), which can be accomplished by conventional noise reduction means such as spectral subtraction or spectral inversion.

Beamforming is a common tool used to locate and distinguish or separate sound sources. The sound radiated by an acoustic source is captured using a plurality of microphones, called an acoustic or microphone array, frequently placed in a two-dimensional plane. The array steers the microphone signals to several positions in a focusing plane where the source is sought. Systems designed to receive spatially propagating signals often encounter the presence of interference signals. If the desired signal and interferers occupy the same temporal and frequency bands, then temporal and frequency filtering cannot be used to robustly separate signal from interference. However, the desired and interfering signals usually originate from different spatial locations and interact with the environment in different ways. The differences imparted by the different points of emanation can be exploited to separate signal from interference using a spatial filter at the receiver. A temporal filter often requires processing the collected signal data over a temporal aperture, in addition to any spatial filtering.

The pressure and velocity of a homogeneous acoustic field are governed by the Helmholtz equations. Any spatial wave field can also be described using the solutions to these equations. One approach to solving the acoustic wave equation is based on the pressure and its normal derivatives at a boundary. Green's second identity is applied to the homogeneous acoustic wave Helmholtz's equation to obtain the Helmholtz Integral Equation. The Green's Function represents an impulse response to an inhomogeneous differential equation. For a spatially constrained source located at a particular location (i.e., a point source in space), the Green's Function represents the transfer function of the acoustic channel between the source and any other location in space, as well as provides for boundary conditions (e.g. the location and other properties of walls, floor, and ceiling of an interior room), thereby modeling both the physical and geometrical properties of the acoustic environment. Optimally estimating the one or more Green's Functions of an acoustic environment and the sound capture system that receives the audio input allows the reconstruction of the one or more original sounds that emanate from point sources in the environment. Green's Function processing thereby theoretically allows separation of acoustic sources in real environments with fewer microphones than other spatial processing methods, such as beamforming.

Referring now to the invention in more detail, FIG. 1 is a system diagram of an embodiment of the invention. In more detail, still referring to the invention of FIG. 1, a transmitting device 450 is operable to receive a signal of interest and modulate an operating frequency in response to the signal of interest. In a preferred embodiment, the signal of interest is an audio signal, and the modulated operating frequency is transmitted as visible light. Modulated operating frequency from transmitter 450 may travel to a receiver 650 via a free space optical path 12. In a preferred embodiment, the modulated operating frequency may be received by a photo detector 620, which may be operable to produce a signal that is demodulated by receiver 650 to reproduce the audio signal modulated by transmitter 450.

Figure 2:
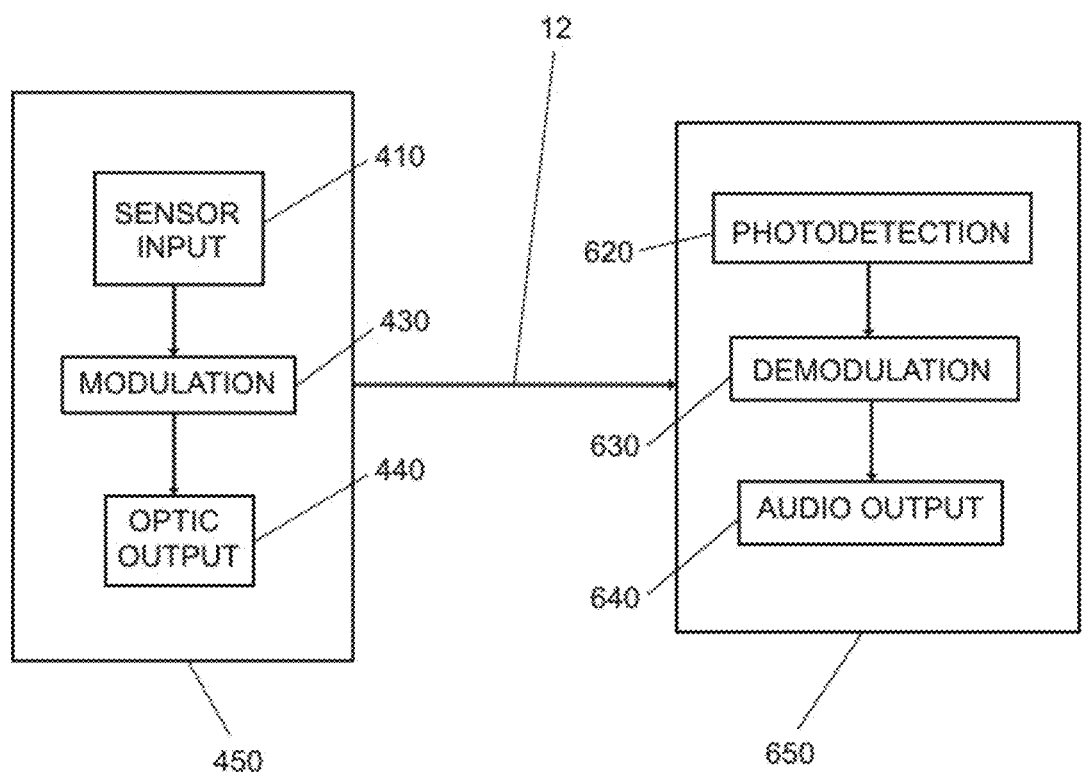
FIG. 2 is a functional block diagram of an embodiment of the system of this invention.

Referring now to the invention in more detail, FIG. 2 is a functional block diagram of an embodiment of the system of this invention. In more detail, still referring to the invention of FIG. 2, a transmitting device 450 is operable to receive a signal of interest via a sensor input 410. In a preferred embodiment, the signal of interest is an audio signal. The audio signal may be modulated by a modulator 430, whereby modulator 430 converts the audio signal to a modulated operating frequency. An optic output 440 is operable to transmit the modulated operating frequency as an electromagnetic frequency; in a preferred embodiment, the electromagnetic frequency is emitted as visible light.

Modulated operating frequency emitted from transmitter 450 may travel to a receiver 650 via a free space optical path 12. In a preferred embodiment, the modulated operating frequency may be received by a photodetector 620. The modulated operating frequency received by photodetector 620 may be communicated to a demodulator 630. Demodulator 630 may be operable to convert the electromagnetic modulated operating frequency to a demodulated frequency. In a preferred embodiment, the demodulated frequency is converted to an audio signal by audio output 640, wherein the audio signal is of substantially the same frequency as that of the original audio signal received by sensor input 410.

Figure 3:
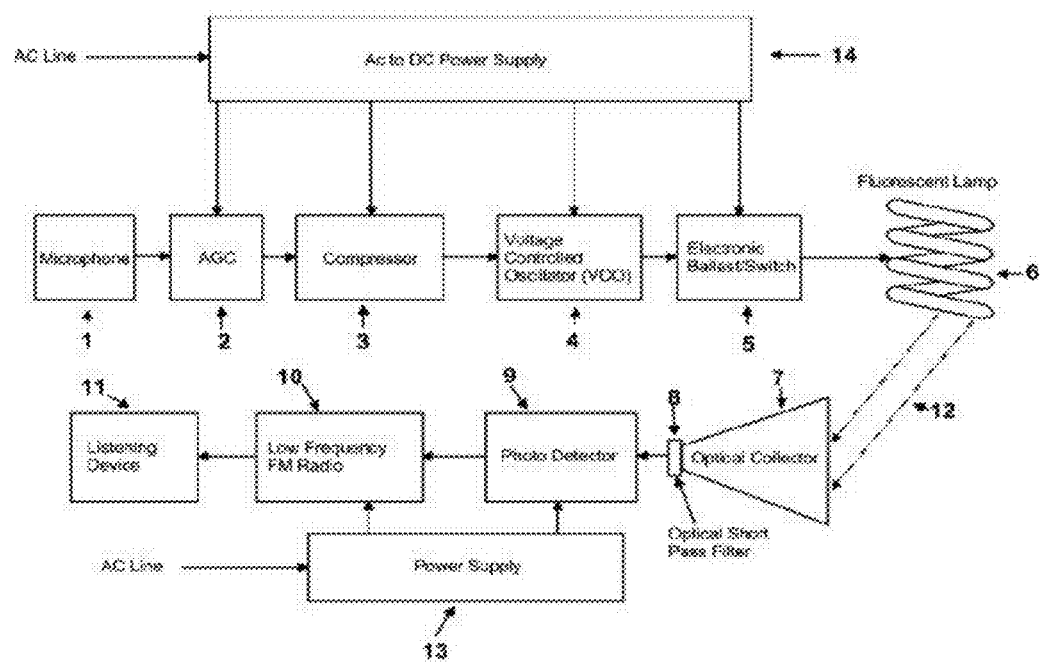
FIG. 3 is a functional block diagram of an embodiment of the system of this invention, illustrating functional component processes of a transmitter and receiver.

Referring now to the invention in more detail, in FIG. 3 there is shown a functional system block diagram of an embodiment of the invention. In more detail, still referring to the invention of FIG. 3, the transmitting device may consist of a compact fluorescent lamp (CFL) 6 whose operating electronic ballast 5 has been modified to allow modulation of its operating frequency by a signal of interest. The front end of the receiver side consists of an optical collection system made up of an optical collector (i.e. a lens subsystem) 7, a filter 8, and a photo-detector 9. In the embodiment, the signal of interest is audio collected on the transmit side by a microphone 1 and on the receive side the photo-detector 9 produces a signal that is demodulated by a low carrier frequency, frequency modulation (FM) radio 10 to reproduce the original audio signal.

The construction details of the invention as shown in FIG. 3 will now be discussed. The transmitting part of the system consists of a microphone 1 coupled to an automatic gain controlled (AGC) amplifier 2 to adjust for audio signal levels at the microphone 1, and an audio compressor 3 which maintains a constant current level being fed to the voltage controlled oscillator (VCO) 4, and ballast 5, thus avoiding sudden changes in the audio signal causing the fluorescent lamp to flicker. AGC amplifier 2 and compressor 3 could be combined as a dynamic range control (DRC) step. DRC may further include an expansion step, in addition to compressing and limiting. VCO 4 provides the operating frequency for the electronic switch and ballast 5 that operates the fluorescent lamp tube 6. Power for the electronic circuits is via an AC to DC converter 13. Light from the transmitter travels to the receiver along a free space optical path 12. VCO 4 is a design choice to perform the function of modulation and could be readily substituted for other hardware/software/circuitry solutions for modulation.

The receiver section of the system consists of optical collector 7 coupled to a short pass filter 8 to reduce infrared interference, and a focusing lens on the front of the photo-detector (not shown). The use of the front optical collector 7 provides additional signal to the receiver. The blue enhanced photo-detector 9 collects light over the visible and near UV wavelengths. The short pass filter 8 blocks infrared light, in order to minimize the ambient light interference. An optional UV blocking filter can also be inserted into the optical chain to minimize ambient light interference. The photo-detector 9 converts the transmitter's frequency modulated light into an electrical signal. The output of the photo-detector 9 is fed into a low frequency FM demodulator 10 for recovery of the audio signal. The FM demodulator 10 is tuned to the center frequency of the VCO 4 in the transmitter for optimum performance. FM demodulator 10 is a design choice to perform the function of demodulation and could be readily substituted for other hardware/software/circuitry solutions for demodulation. The output of the FM demodulator 10 is fed to the listening device 11 such as a head set or speaker. Power for the receiver is via a standard AC to DC power supply 13.

Other variations on this construction technique include replacement of the transmitter's CFL bulb with an LED (Light Emitting Diode) or HID (High Intensity Discharge) lamp; replacement of the modulation technique with another frequency-based type, such as FSK (Frequency Shift Keying), for transmission of digital data.

Figure 4:
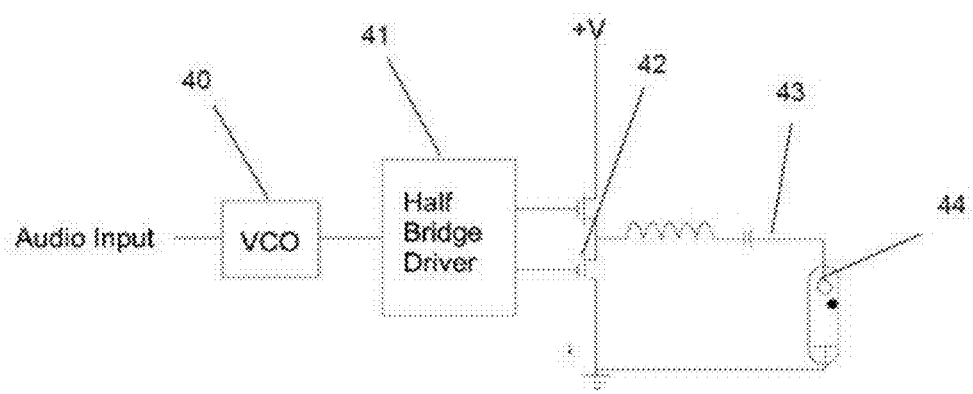
FIG. 4 is a schematic diagram of an optical communication system's transmitter in an embodiment of the invention.

Referring now to the invention shown in FIG. 4, there is shown the schematic diagram of an embodiment of the transmitter's ballast modulation circuitry.

In more detail, still referring to the invention of FIG. 4, there is shown the voltage controlled oscillator (VCO) 40, half bridge driver 41 (optional), switching transistors 42, ballast circuit 43, and fluorescent lamp bulb circuitry that comprise the means for modulation and transmission of the optical communications in the embodiment of the invention.

The construction details of embodiments of the present disclosure, as shown in FIG. 4, show the relationship of the VCO 40, half bridge driver 41, switching transistors 42, ballast circuit 43, and lamp 6 (FIG. 3). The ballast circuit 43 consists of an inductor and capacitor in a resonant circuit 44. The operating point on the resonant circuit's response curve determines the current through the lamp 6. As the frequency changes, the current changes based upon the response curve's operating point. Small shifts in frequency only cause small current changes, hence small light output changes. Sudden large changes cause large current changes, and can turn the lamp 6 off if excessive, or cause a noticeable flicker.

Other variations on this construction technique have been conceived and prototyped by one or more of the inventors, including but not limited to incorporation of other styles of fluorescent and high intensity discharge lighting devices. For example, in an alternative embodiment where the light source is comprised of one or more light emitting diodes (LEDs) rather than a compact fluorescent tube, the bulb circuitry would vary from that shown in FIG. 4. In such an embodiment, the half bridge driver 41 and ballast circuit 43 may be substituted for a series resistor and parallel field-effect transistors (FET). Other commercially viable circuitry and/or hardware configurations and/or combinations are anticipated, provided such combinations are operable to enable sufficient modulation of the light intensity at the light source, as described herein.

Figure 5:
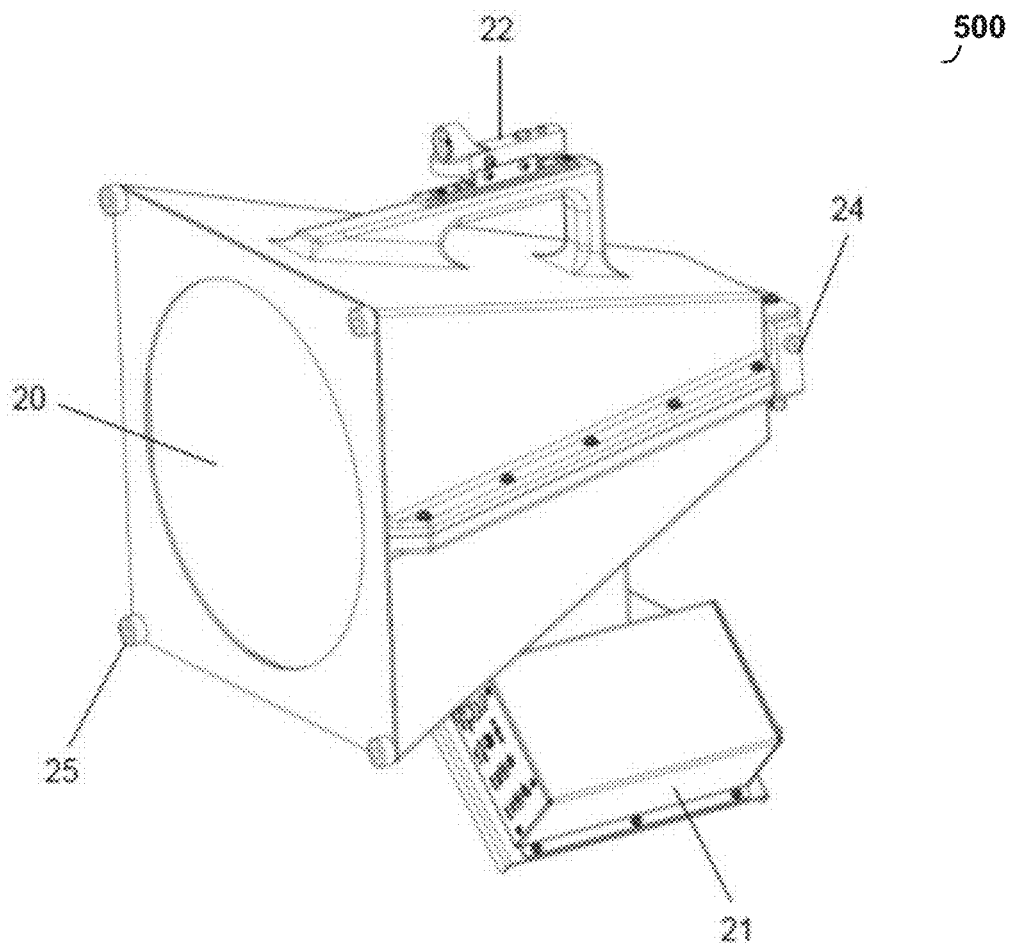
FIG. 5 is an illustration of the optical communication system's receiver in an embodiment of the invention.

Referring now to the invention shown in FIG. 5, there is shown an illustration of a receiver assembly of an embodiment of the invention.

In more detail, still referring to the invention of FIG. 5 there is shown an optical collector 500 generally comprised of a Fresnel lens 20, spotting sight 22, photo-detector with amplifier 24, protective bumpers 25, and FM demodulator with audio output 21.

The construction details of the invention as shown in FIG. 5 are, in an embodiment, an optical collector 500 constructed using a Fresnel lens 20 which is focused down to the front end of the photo-detector 24 which has a gain adjustment (not shown). The spotting sight 22 is used to assist in alignment in both bearing and elevation when the system is used over a long distance and is removable when not needed for operation and in shipment. The output of the photo-detector 24 is cabled to the input of the FM demodulator 21 which has a peak finder circuit and provides both audible (through headphone output) and visual (through light emitting diode) indicators to assist the user in determining when the steering alignment has been maximized for signal strength. The FM demodulator 21 includes software to track any frequency drift that may occur in the transmitter's frequency. The FM demodulator 21 also outputs the demodulated audio at line, microphone, and line levels so that the user may reproduce the received audio on a loudspeaker, headset, or similar device, as well as transmit or record the received audio. Optical collector 500 as shown and described in FIG. 5 is merely illustrative of an embodiment of an optical collector utilized by the present invention. Numerous alternative embodiments of optical collector 500 are anticipated. The size and configuration of optical collector 500 will vary depending on the distance from which the optical collector needs to collect the modulated light intensity from the light source; i.e. the lens of optical received 500 functions as a directional gain, so for short distances the optical collector may be lens-less. For example, in a body-worn embodiment (as further described in FIGS. 7-9) the optical collector may be configured as one or more photo diodes or avalanche photo diodes (APD) disposed on a headband or other body-worn device. In certain embodiments, the optical collector may even be configured as a camera lens on a smart phone.

Other variations on this construction technique have been conceived or prototyped by the inventor, including but not limited to replacement of the receiver's Fresnel lens with other optics, such as a spotting scope or telescope; removal of the receiver's lens completely for short range links where the received signal is very strong; use of wireless connections instead of cabling at the receiver; replacement of the receiver's photo-detector with a photo-multiplier tube or similar device; replacement of the demodulation technique with another frequency-based type, such as FSK (Frequency Shift Keying), for demodulation of digital data; and the replacement of the digital FM demodulator circuitry with an analog equivalent.

Figure 6:
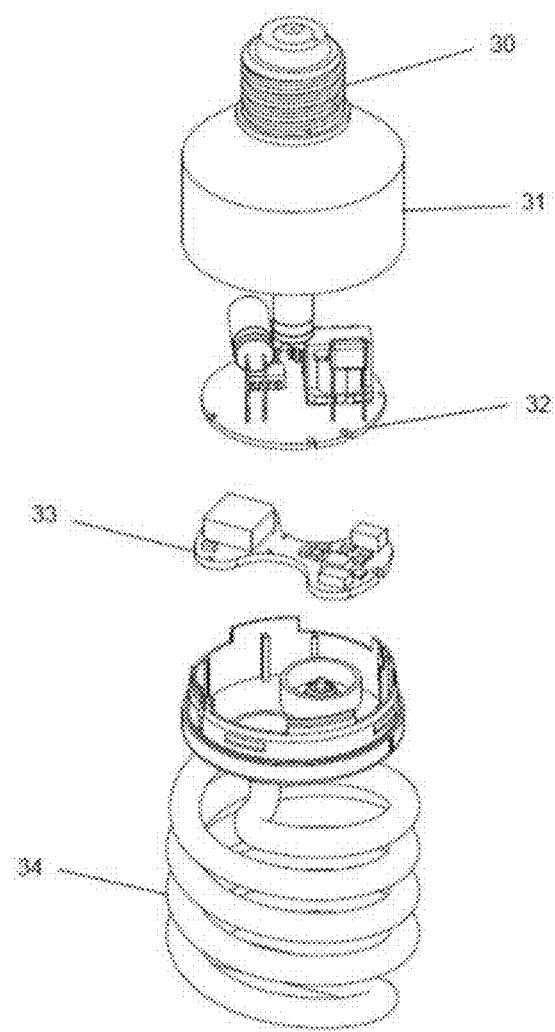
FIG. 6 is a cut-away of an embodiment of the invention illustrating the construction of a fluorescent lamp bulb transmitter.

Referring now to the invention shown in FIG. 6, there is shown a cut-away of an embodiment of the invention illustrating the construction of a compact fluorescent lamp bulb transmitter.

In more detail, still referring to the invention of FIG. 6, there is shown the screw 30, lamp base 31, lamp ballast circuit 32, microphone and modulator board 33, and fluorescent tube 34.

The construction details of the invention as shown in FIG. 6 are, in an embodiment, a commercial-off-the-shelf compact fluorescent lamp with the microphone and modulator board 33 added in the electrical circuit in order to modulate the ballast refresh rate. Other variations on this construction technique have been conceived or prototyped by the inventor, including but not limited to other fluorescent tubes and gas discharge devices; alternative modulator circuit designs; and other fluorescent lamps of various sizes and form factors.

The advantages of the present invention include, without limitation, (a) The transmitting apparatus provides a means of collecting audio or other data and transmitting it to a remote location via a free space optical signal;
(b) The transmitting apparatus utilizes a commonly available style CFL or LED bulb frequently used in residential and commercial buildings, modified to act as an optical transmitter of data, while providing functional operation of the apparatus as a lighting device;
(c) The design of the apparatus allows it to be deeply integrated into other electrical/electronic devices and commonly available building components and accessories;
(d) The successful operation of the apparatus does not require direct line of sight, merely the observance of the direct, diffuse, refracted, or reflected light, thus providing greater flexibility in the installation and operation of the device;
(e) The operating frequency of the system provides immunity from most outside electromagnetic and optical interference sources at the receiver and is only limited by the ballast design parameters, thus changes in these parameters will allow for changes in the operating frequency;
(f) Utilization of an optical transmission signal avoids the dangers and other issues associated with radio frequency signals in sensitive areas such as law enforcement applications, medical radiology centers, and chemical manufacturing areas;
(g) The data modulation apparatus may utilize compression circuitry to limit any sudden changes in its output signal that may result from sudden changes in its input signal, thus maintaining a constant lamp drive current and illumination;
(h) The design compensates for lamp current variations through use of the compressor circuit and voltage-controlled oscillator, caused by the inherent nature of the ballast components that are frequency sensitive, hence can cause lamp light flicker from large input signals;
(i) The CFL light source can be changed to other gas discharge and solid-state lighting systems, including ultraviolet, infrared, and light emitting diode (LED) sources to provide the same capabilities as the current embodiment; and
(j) The simplicity of the design provides low cost of manufacture, ease of installation, and high reliability.

There are numerous applications that could benefit from the present invention, including airports, the meat packing industry, oil/gas industry, medical radiology centers, chemical plants involved with explosive materials, libraries and museums, and law enforcement.

In broad embodiment, the present invention is a communication system that utilizes free space optical signaling and whose transmitting component is installed in a conventional lighting system, based on CFL, LED, gas discharge, or similar technologies, which incorporate a refresh rate.

Figure 7:
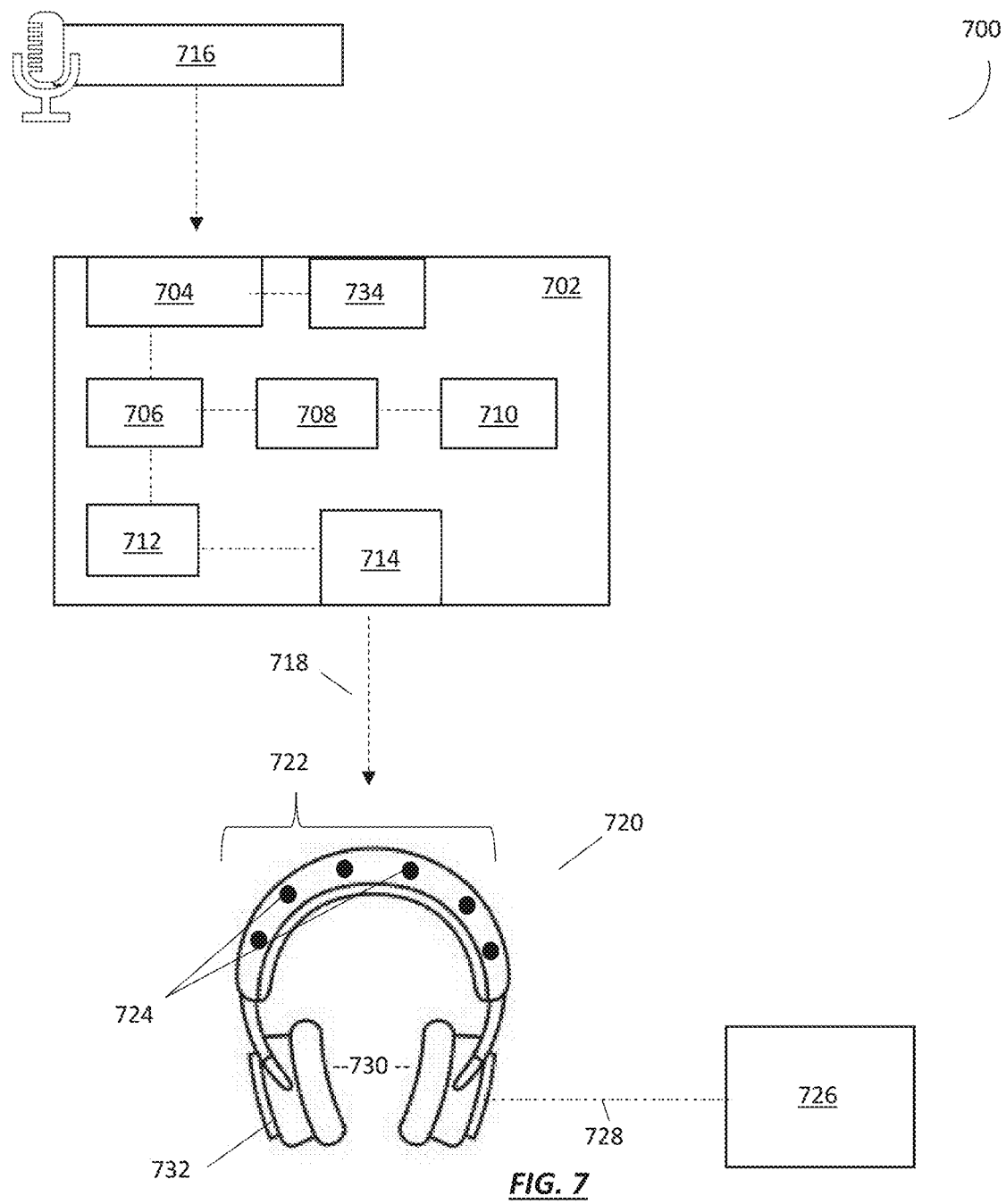
FIG. 7 is a functional block diagram of a visible light audio system, according to an embodiment of the present disclosure.
Figure 8:
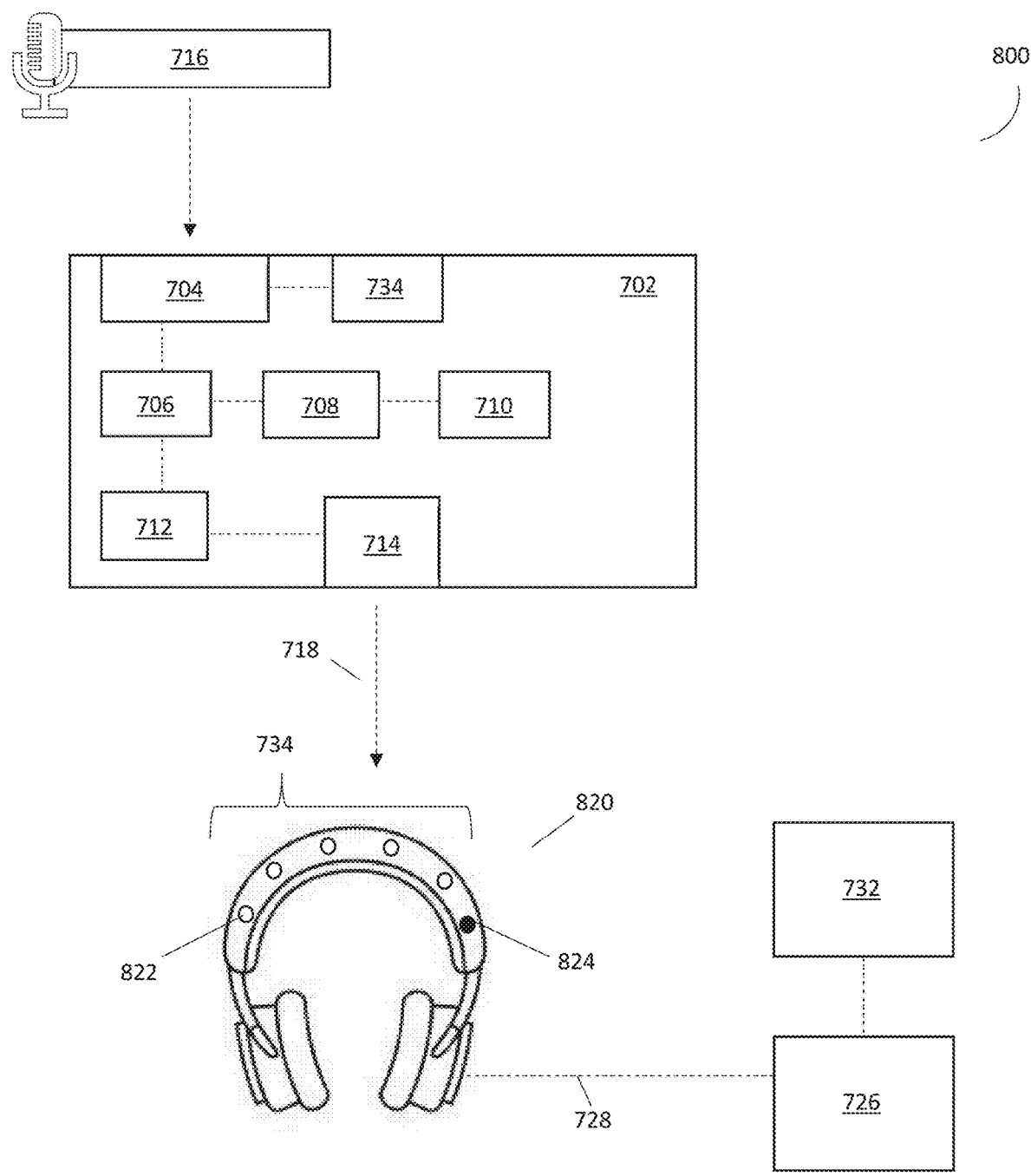
FIG. 8 is a functional block diagram of a visible light audio system, according to an embodiment of the present disclosure.
Figure 9:
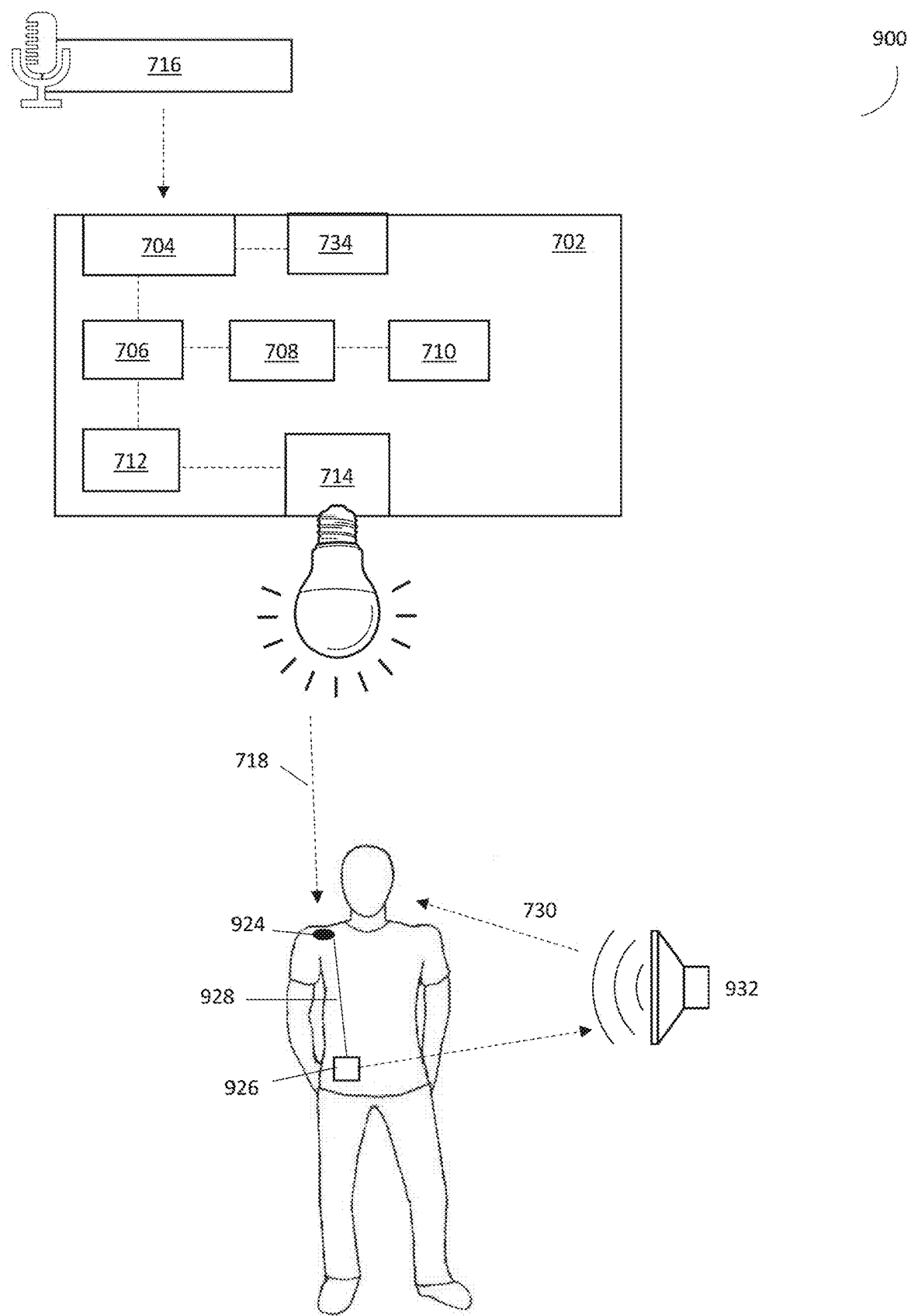
FIG. 9 is a functional block diagram of a visible light audio system, according to an embodiment of the present disclosure.

Referring now to FIGS. 7-9, a functional block diagram of a visible light audio system 700 is shown. According embodiments of the present disclosure, visible light audio system 700 is operable to enable free space optical communication of audio signals via transmission of modulated light intensity at a light source to a photo diode being operably engaged with a demodulator and audio output device. Embodiments of visible light audio system 700 may be utilized, for example, in commercial, residential, or church buildings to transmit audio signals to occupants via the overhead lighting of the building. Audio signals transmitted to occupants via the overhead lighting might include prerecorded messages or a telecommunications circuit; for example, in a hotel, the lighting in the lobby might communicate a message to an ear piece of a blind person that he or she is located in the lobby and the reception desk is 30 feet to their right. Alternatively, audio signals transmitted to occupants via the overhead lighting might include live messages; for example, a microphone input from an individual addressing an audience, where the lighting will communicate such microphone input to a photo diode worn by a hearing impaired individual to enable amplification of the audio to an assistive listening device. Embodiments of the present disclosure may be utilized in any commercial application where line of sight transmission of an audio signal is required or beneficial for occupants of an interior structure to receive a location-specific audio message.

Referring now to FIG. 7, according to an embodiment of the present disclosure a visible light audio system 700 is generally comprised of a visible light transmitting apparatus 702, a headband 720 having one or more photo diodes, a demodulation device 726, and an audio output device 732. Visible light transmitting apparatus 702 may be generally comprised of an audio compressor or limiter 704, a voltage-controlled oscillator 706, a half bridge driver 708, at least one switching transistor 710, a ballast circuit 712, and a light source 714. Light source 714 may consist of one or more compact fluorescent light bulbs, one or more light emitting diodes, one or more LED bulbs, and one or more high intensity discharge lamps. As discussed above, for embodiments where the light source 714 is comprised of one or more light emitting diodes (LEDs) rather than a compact fluorescent tube, half bridge driver 708 and ballast circuit 712 may be substituted for a series resistor and parallel field-effect transistors (FET). Visible light transmitting apparatus 702 may further comprise a battery to serve as a backup power source in the event of a power outage. Visible light transmitting apparatus 702 is operable to receive an audio source input 716 at audio compressor or limiter 704. Audio compressor or limiter 704 is operable to compress the audio input for modulation. Voltage controlled oscillator 706, half bridge driver 708, switching transistor 710, and ballast circuit 712 are operable engaged with light source 714 to produce a modulated light intensity at light source 714 corresponding to the modulated audio input. Visible light transmitting apparatus 702 may further comprise an automatic gain-controlled amplifier 734 operable engaged with audio compressor or limiter 704. Visible light audio system 700 may further comprise one or more microphones operably engaged with automatic gain-controlled amplifier 734 for the transmission of a live audio source input 716 for modulation and transmission by visible light transmitting apparatus 702. Visible light transmitting apparatus 702 should be configured to be installed in a conventional, off-the-shelf lighting fixture. Visible light audio system 700 may be comprised of a plurality of visible light transmitting apparatuses 702 being installed in a commercial or residential dwelling and operably engaged over a network. In certain embodiments, visible light transmitting apparatus 702 may further comprise one or more photoreceptors disposed on a surface of the housing (i.e. bulb). Photoreceptors disposed on a surface of the housing of visible light transmitting apparatus 702 would enable visible light transmitting apparatus to also receive modulated light intensity as well as transmit a modulated light intensity at the light source; i.e. visible light transmitting apparatus 702 could function as a transceiver.

Still referring to FIG. 7 and according to an embodiment of the present disclosure, headband 720 has a plurality of photo diodes 724 disposed on an upper surface of headband 720. The plurality of photo diodes 724 define a photo detector array 722. Photo detector array 722 is operable to receive the modulated light intensity 718 and convert the modulated light intensity 718 into an electrical signal. Demodulation device 726 is operably engaged with photo detector array 722 to receive the modulated frequency via a system bus 728. Demodulation device 726 is operable to demodulate the electrical signal to produce an audio output 730 corresponding to audio source input 716. An audio output device 732 is operably engaged with demodulation device 726 to deliver audio output 730. Audio output device 732 may comprise one or more speakers or earpieces. According to an embodiment, the audio output device and headband comprise a set of headphones to be worn by a user.

Referring now to FIG. 8, a functional block diagram of a visible light audio system 800 is shown. According to an embodiment of the present disclosure, visible light audio system 800 is generally comprised of a visible light transmitting apparatus 702, a headband 820, a demodulation device 726, and an audio output device 732. According to the embodiment shown in FIG. 8, visible light transmitting apparatus 702 is of substantially the same form and function as described in FIG. 7 above. As shown in FIG. 8, headband 820 has a plurality of photomultiplier tubes 822 disposed on an upper surface of headband 820. The plurality of photomultiplier tubes 822 are disposed on the upper surface of headband 820 such that the terminal ends of a plurality of photomultiplier tubes 822 define a photomultiplier array 734. Photomultiplier tubes 822 are operably engaged with at least one photo detector amplifier 824 to deliver the modulated light intensity 718 to photo detector amplifier 824. Photo detector amplifier 824 is operable to receive modulated light intensity 718 and convert modulated light intensity 718 into an electrical signal containing the modulated frequency. Demodulation device 726 is operably engaged with photo detector amplifier 824 to receive the modulated frequency via a system bus 728. Demodulation device 726 is operable to demodulate the electrical signal to produce an audio output 730 (not shown) corresponding to audio source input 716. An audio output device 732 is operably engaged with demodulation device 726 to deliver audio output 730. Audio output device 732 may comprise one or more speakers or earpieces.

Referring now to FIG. 9, a functional block diagram of a visible light audio system 900 is shown. According to an embodiment of the present disclosure, visible light audio system 900 is generally comprised of a visible light transmitting apparatus 702, a body-worn receiver 924, a demodulation device 926, and an audio output device 932. According to the embodiment shown in FIG. 9, visible light transmitting apparatus 702 is of substantially the same form and function as described in FIG. 7 above. According to the embodiment shown in FIG. 9, body-worn receiver 924 is comprised of at least one photo detector disposed on a surface of body-worn receiver 924. The photo detector of body-worn receiver 924 is operable to receive modulated light intensity 718 and convert the modulated light intensity into an electrical signal containing the modulated frequency. Demodulation device 926 is operably engaged with body-worn receiver 924 to receive the modulated frequency via a system bus 928. Demodulation device 926 is operable to demodulate the electrical signal to produce an audio output 730 corresponding to audio source input 716. An audio output device 932 is operably engaged with demodulation device 926 to deliver audio output 730. Audio output device 932 may comprise one or more speakers or ear pieces.

Still referring generally to FIGS. 7-9, in certain embodiments visible light transmitting apparatus 702 may be installed and implemented in live audio environments to support spatial or spectral processing to identify and separate audio from a three-dimensional point source (further described in FIGS. 10-11, below). In such embodiments, visible light transmitting apparatus 702 may comprise a plate or dome such that visible light transmitting apparatus 702 has at least four microphones comprising an array and separated by a pre-defined distance; e.g. two inches. Visible light transmitting apparatus 702 may have an audio processor built into the bulb base or into the plate/dome fixture and may be hard wired for electrical power. An audio input may be spatially captured by the microphone array and rendered to separate a spatially filtered audio output (as further described in FIGS. 10-11, below). In certain embodiments, each acoustic source location that exceeds an ambient noise level for a threshold period may be separated. In embodiments requiring live control, visible light transmitting apparatus 702 may comprise a Bluetooth link such that a smartphone application, or other Bluetooth enabled device, could control a source location selection. Likewise, multiple bulbs may be networked together to cover a larger space and/or provide an alternative embodiment to a bulb with a dome/hood/reflector comprising multiple microphones. Multiple bulbs may be networked together via a wireless communications interface, such as Bluetooth of WiFi; or via a wired communications interface, such as power-line communications.

Figure 10:
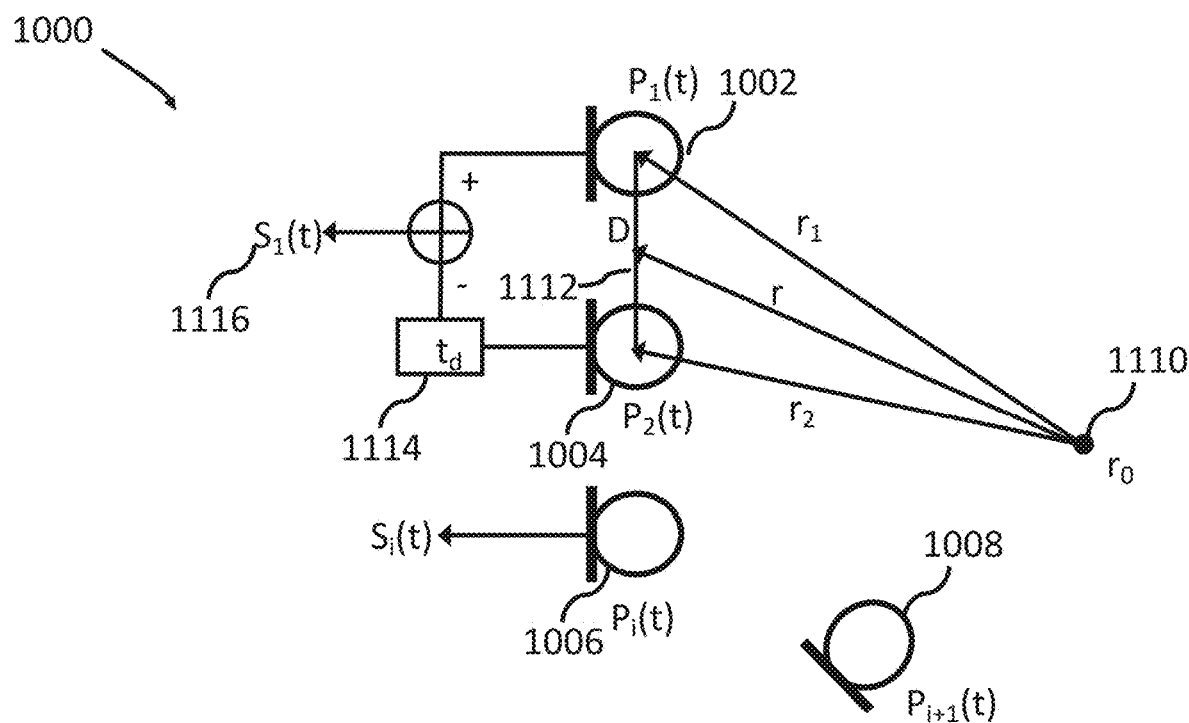
FIG. 10 is an acoustic array and audio source topology, according to an embodiment of the present disclosure.

Referring to FIG. 10, an acoustic array and audio source topology 1000 is shown, according to various embodiments. The acoustic array comprises one or more audio source input 1002,1004,1006,1008, equivalent to one or more audio source input 716 of FIG. 7, where the $i^{th}$ audio source 1006 of the light visible transmitting apparatus is located at $x_i$ is used to measure the sound pressure $P_i(t)$ of a given source 1110 with a spatial coordinate $r_0$. In various embodiments, the one or more audio source may be positioned or spaced to form a linear, planar, or three-dimensional spatially distributed array or topology. For example, audio source 1002 and 1004 may be spaced at a distant D 1112, connected and combined with a delay element 1114 to form a first-order differential acoustic array producing an output electrical signal S(t). In various embodiments, elements 1002, 1004, and 1008 may be positioned and connected to form a second-order differential acoustic array. In various embodiments, one or more audio sources may be positioned, connected, or cascaded to form an $n^{th}$-order differential acoustic array or topology with one more directional response, including but not limited to, cardioid, super-cardioid, hyper-cardioid, clover-leaf, or the like. In various embodiments, the one or more audio sources may be positioned, connected, or cascaded to form an $n^{th}$-order differential acoustic array or topology to create at least one acoustic beamformer. With adjustments well known by those skilled in the art, the same arrangement of microphones can also be used to form an acoustic focus summation beamformer, and adaptive beamformer, or a matched field array processor.

Figure 11:
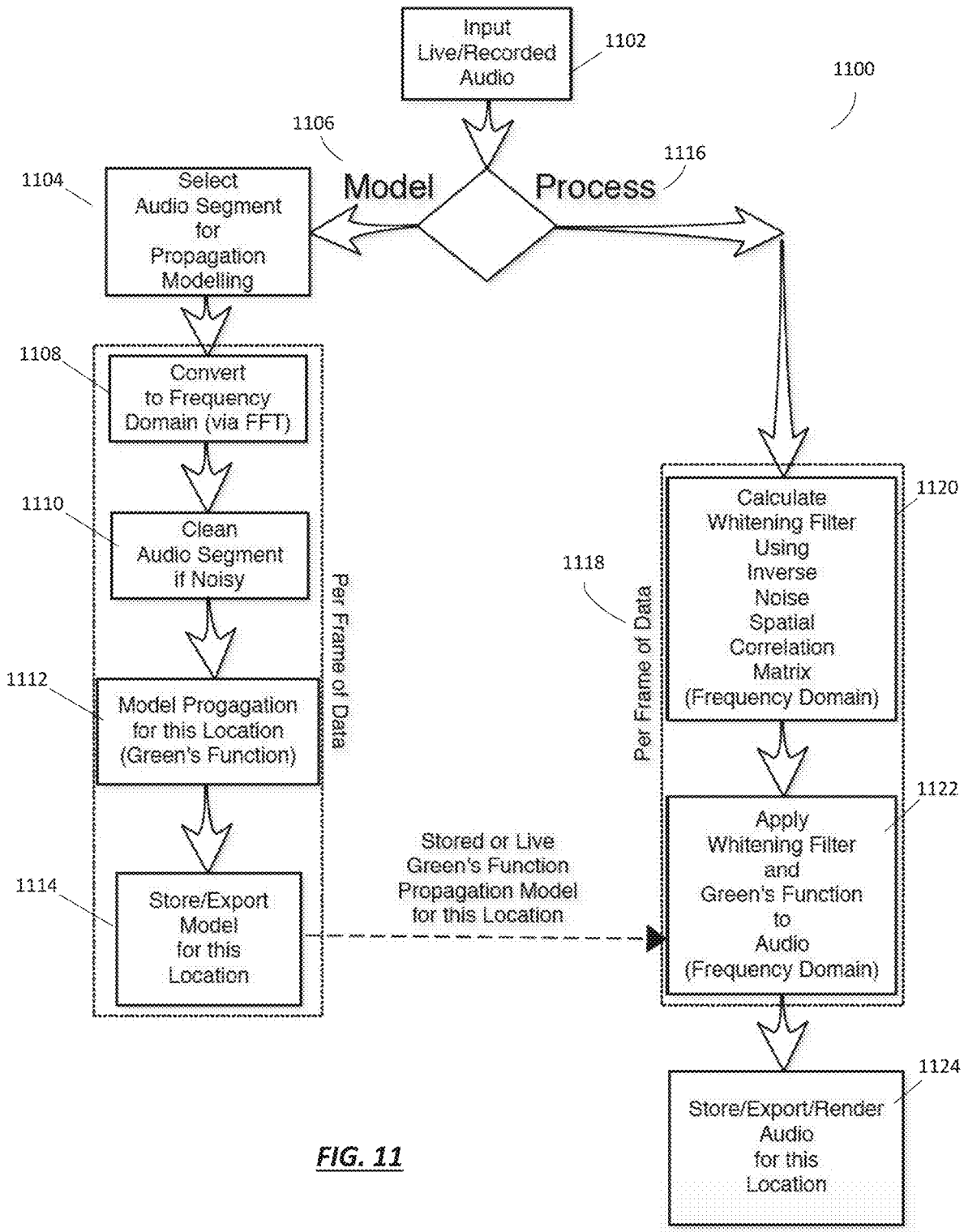
FIG. 11 is a process flow diagram illustrating a method of beam forming, according to an embodiment of the present disclosure.

Referring now to FIG. 11, a process flow diagram for a matched field array processor based on Green's Function sound propagation modeling and processing method is shown. According to an embodiment, the routine commences with an audio input step 1102 before proceeding to either a modeling or a processing route. The modeling process comprises step 1104 whereby one or more audio signal segment data is selected for modeling purposes. The audio input data is then processed through routine 1106 further comprising sequential sub-steps that are executed per frame of data. In a first sub-step 1108, the selected audio input is optionally cleaned using one or more filter or one or more weight parameters 1110. In a second sub-step, the Green's Function propagation model parameters are estimated for a location corresponding to the audio input propagated through the acoustic environment to the audio inputs at the one or more transmitting apparatuses 1112. In a third sub-step, the Green's Function data for the location is stored for export by step 1114. In various embodiments, step 1114 comprises stored or live Green's Function data for this location. Referring now to the processing route, in step 1116, a live or recorded input data signal is received for processing by routine 1118 comprising sequential sub-steps executed per frame of data. In sub-step 1120, an Inverse Noise Spatial Correlation statistical matrix is calculated from the audio input data signal accordingly. In sub-step 1122, the signal is adaptively whitened in the frequency domain for a location with input received from step 1114 of training routine 1106 using the Inverse Noise Spatial Correlation Matrix from the previous sub-step along with the Green's Function for this spatial location. In a final sub-step 1124, the results are stored, exported, or rendered for this location.

Figure 12:
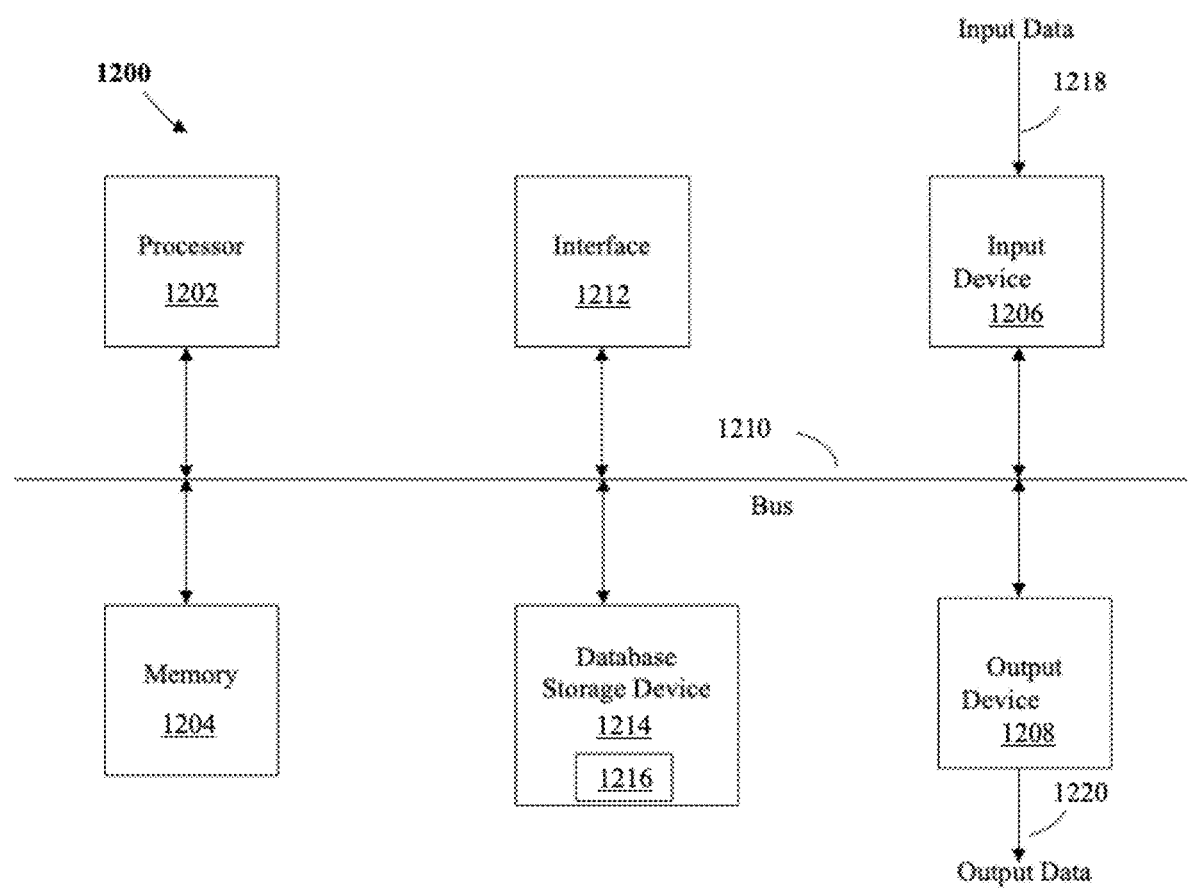
FIG. 12 is a functional block diagram of a processor-implemented computing device in which one or more aspects of the present disclosure may be implemented.

Referring now to FIG. 12, a processor-implemented computing device in which one or more aspects of the present disclosure may be implemented is shown. According to an embodiment, a processing system 1200 may generally comprise at least one processor 1202, or a processing unit or plurality of processors, memory 1204, at least one input device 1206 and at least one output device 1208, coupled together via a bus or a group of buses 1210. In certain embodiments, input device 1206 and output device 1208 could be the same device. An interface 1212 can also be provided for coupling the processing system 1200 to one or more peripheral devices, for example interface 1212 could be a PCI card or a PC card. At least one storage device 1214 which houses at least one database 1216 can also be provided. The memory 1204 can be any form of memory device, for example, volatile or non-volatile memory, solid state storage devices, magnetic devices, etc. The processor 1202 can comprise more than one distinct processing device, for example to handle different functions within the processing system 1200. Input device 1206 receives input data 1218 and can comprise, for example, a keyboard, a pointer device such as a pen-like device or a mouse, an audio receiving device for voice controlled activation such as a microphone, a data receiver or antenna such as a modem or a wireless data adaptor, a data acquisition card, etc. Input data 1218 can come from different sources, for example keyboard instructions in conjunction with data received via a network. Output device 1208 produces or generates output data 1220 and can comprise, for example, a display device or monitor in which case output data 1220 is visual, a printer in which case output data 1220 is printed, a port, such as for example a USB port, a peripheral component adaptor, a data transmitter or antenna such as a modem or wireless network adaptor, etc. Output data 1220 can be distinct and/or derived from different output devices, for example a visual display on a monitor in conjunction with data transmitted to a network. A user could view data output, or an interpretation of the data output, on, for example, a monitor or using a printer. The storage device 1214 can be any form of data or information storage means, for example, volatile or non-volatile memory, solid state storage devices, magnetic devices, etc.

In use, the processing system 1200 is adapted to allow data or information to be stored in and/or retrieved from, via wired or wireless communication means, at least one database 1216. The interface 1212 may allow wired and/or wireless communication between the processing unit 1202 and peripheral components that may serve a specialized purpose. In general, the processor 1202 can receive instructions as input data 1218 via input device 1206 and can display processed results or other output to a user by utilizing output device 1208. More than one input device 1206 and/or output device 1208 can be provided. It should be appreciated that the processing system 1200 may be any form of terminal, server, specialized hardware, or the like.

It is to be appreciated that the processing system 1200 may be a part of a networked communications system. Processing system 1200 could connect to a network, for example the Internet or a WAN. Input data 1218 and output data 1220 can be communicated to other devices via the network. The transfer of information and/or data over the network can be achieved using wired communications means or wireless communications means. The transfer of information and/or data over the network may be synchronized according to one or more data transfer protocols between central and peripheral device(s). In certain embodiments, one or more central/master device may serve as a broker between one or more peripheral/slave device(s) for communication between one or more networked devices and a server. A server can facilitate the transfer of data between the network and one or more databases. A server and one or more database(s) provide an example of a suitable information source.

Thus, the processing computing system environment 1200 illustrated in FIG. 12 may operate in a networked environment using logical connections to one or more remote computers. In embodiments, the remote computer may be a personal computer, a server, a router, a network PC, a peer device, or other common network node, and typically includes many or all of the elements described above.

It is to be further appreciated that the logical connections depicted in FIG. 12 include a local area network (LAN) and a wide area network (WAN) but may also include other networks such as a personal area network (PAN). Such networking environments are commonplace in offices, enterprise-wide computer networks, intranets, and the Internet. For instance, when used in a LAN networking environment, the computing system environment 1200 is connected to the LAN through a network interface or adapter. When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the computing system environment 1200, or portions thereof, may be stored in a remote memory storage device. It is to be appreciated that the illustrated network connections of FIG. 12 are exemplary and other means of establishing a communications link between multiple computers may be used.

FIG. 12 is intended to provide a brief, general description of an illustrative and/or suitable exemplary environment in which embodiments of the invention may be implemented. That is, FIG. 12 is but an example of a suitable environment and is not intended to suggest any limitations as to the structure, scope of use, or functionality of embodiments of the present invention exemplified therein. A particular environment should not be interpreted as having any dependency or requirement relating to any one or a specific combination of components illustrated in an exemplified operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as the computing system environment 1200 of FIG. 12. As such, it will be understood that such acts and operations, which are at times referred to as being computer-executed, include the manipulation by the processor of the computer of electrical signals representing data in a structured form. This manipulation transforms data or maintains it at locations in the memory system of the computer, which reconfigures or otherwise alters the operation of the computer in a manner that is conventionally understood by those skilled in the art. The data structures in which data is maintained are physical locations of the memory that have particular properties defined by the format of the data. However, while certain embodiments may be described in the foregoing context, the scope of the disclosure is not meant to be limiting thereto, as those of skill in the art will appreciate that the acts and operations described hereinafter may also be implemented in hardware.

Embodiments may be implemented with numerous other general-purpose or special-purpose computing devices and computing system environments or configurations. Examples of well-known computing systems, environments, and configurations that may be suitable for use with embodiments of the invention include, but are not limited to, personal computers, handheld or laptop devices, personal digital assistants, multiprocessor systems, microprocessor-based systems, set top boxes, programmable consumer electronics, networks, minicomputers, server computers, game server computers, web server computers, mainframe computers, and distributed computing environments that include any of the above systems or devices.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written and executed in a programming language, whether using a functional, imperative, logical, or object-oriented paradigm, and may be scripted, unscripted, or compiled. Examples of such programming languages include as Java, C, C++, Octave, Python, Swift, Assembly, and the like.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that phases of the processes described herein may be performed in orders different than those illustrated in the flowcharts. In other words, the processes represented by the blocks of a flowchart may, in some embodiments, be in performed in an order other than the order illustrated, may be combined or divided, or may be performed simultaneously. It will also be understood that the blocks of the block diagrams illustrate, in some embodiments, merely conceptual delineations between systems, and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A visible light audio system comprising:
   one or more light transmitting apparatuses being located within an acoustic environment and operably engaged to comprise an array, the plurality of light transmitting apparatuses comprising a plurality of transducers being configured to capture or transmit acoustic audio signals;
   a computing device comprising an audio processing module communicably engaged with the one or more light transmitting apparatuses to receive an audio input comprising the acoustic audio signals, the audio processing module comprising at least one processor and a non-transitory computer readable medium having instructions stored thereon that, when executed, cause the processor to perform one or more spatial audio processing operations, the one or more spatial audio processing operations comprising:
   receiving the audio input comprising the acoustic audio signals;
   processing the audio input to determine at least one acoustic propagation model for at least one source location within the acoustic environment, the at least one acoustic propagation model comprising at least one Green's Function estimation;
   processing the audio input according to the at least one acoustic propagation model to spatially filter at least one target audio signal from one or more non-target audio signals within the audio input to derive a processed audio output, wherein the at least one target audio signal corresponds to the at least one source location; and
   transmitting the processed audio output via the one or more light transmitting apparatuses.

2. The system of claim 1 wherein the one or more light transmitting apparatuses are communicably engaged via a networked configuration.

3. The system of claim 2 wherein the networked configuration comprises a wireless or wireline communications interface.

4. The system of claim 1 wherein the processed audio output comprises a modulated visible light output.

5. The system of claim 1 wherein the one or more spatial audio processing operations further comprise calculating at least one noise reduction filter.

6. The system of claim 1 wherein the one or more spatial audio processing operations further comprise applying a phase correction filter to the processed audio output.

7. The system of claim 1 wherein the audio input comprises a live audio feed.

8. The system of claim 1 wherein the audio input comprises a recorded audio file.

9. The system of claim 1 wherein the one or more spatial audio processing operations further comprise applying a whitening filter to the at least one target audio signal.

10. The system of claim 9 wherein the whitening filter is applied concurrently or concomitantly with the at least one acoustic propagation model.

11. A spatial audio processing method comprising:
    receiving, with one or more light transmitting apparatuses comprising one or more acoustic transducers, an audio input;
    processing, with an audio processor, the audio input to determine at least one acoustic propagation model for at least one source location within an acoustic environment, the at least one acoustic propagation model comprising at least one Green's Function estimation;
    processing, with the audio processor, the audio input according to the at least one acoustic propagation model to spatially filter at least one target audio signal from one or more non-target audio signals within the audio input to derive a processed audio output, wherein the at least one target audio signal corresponds to the at least one source location; and
    transmitting, via the one or more light transmitting apparatuses, the processed audio output.

12. The method of claim 11 wherein the processed audio output comprises a modulated visible light output.

13. The method of claim 12 further comprising receiving, with a receiver device, the modulated visible light output.

14. The method of claim 13 further comprising outputting, with at least one audio output device operably engaged with the receiver device, the processed audio output.

15. The method of claim 11 further comprising calculating, with the audio processor, at least one noise reduction filter.

16. The method of claim 11 further comprising applying, with the audio processor, a phase correction filter to the processed audio output.

17. The method of claim 11 further comprising applying, with the audio processor, a whitening filter to the at least one target audio signal to derive the processed audio output.

18. The method of claim 11 wherein the audio input comprises a live audio feed.

19. The method of claim 11 wherein the audio input comprises a recorded audio file.

20. A non-transitory computer-readable medium encoded with instructions for commanding one or more processors to execute operations of a method for spatial audio processing, the operations comprising:
receiving an audio input comprising at least one target audio signal and non-target audio signals;
processing the audio input to determine at least one acoustic propagation model for at least one source location within an acoustic environment, the at least one acoustic propagation model comprising at least one Green's Function estimation;
processing the audio input according to the at least one acoustic propagation model to spatially filter the at least one target audio signal from the non-target audio signals to derive a processed audio output, wherein the at least one target audio signal corresponds to the at least one source location; and
transmitting the processed audio output via one or more light transmitting devices.

* * * * *